US012807222B2

(12) United States Patent
Kakas et al.

(10) Patent No.: US 12,807,222 B2
(45) Date of Patent: Nov. 24, 2026

(54) METHOD TO CONTROL A STEER-BY-WIRE STEERING SYSTEM OF A MOTOR VEHICLE WITH INCREASED FEEDBACK TORQUE AFTER FAILURE OF STEERING SYSTEM

(71) Applicants: thyssenkrupp Presta AG, Eschen (LI); Honda Motor Co., Ltd., Tokyo (JP)

(72) Inventors: Péter Kakas, Budapest (HU); Imre Szepessy, Mauren (LI); Munetsugu Hanji, Wako (JP); Yosuke Ojima, Wako (JP)

(73) Assignees: THYSSENKRUPP PRESTA AG, Eschen (LI); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/612,470

(22) Filed: Mar. 21, 2024

(65) Prior Publication Data

US 2024/0227932 A1 Jul. 11, 2024

Related U.S. Application Data

(63) Continuation of application No. PCT/EP2021/076000, filed on Sep. 22, 2021.

(51) Int. Cl.
*B62D 6/00* (2006.01)
*B62D 5/04* (2006.01)

(52) U.S. Cl.
CPC .......... *B62D 6/008* (2013.01); *B62D 5/0484* (2013.01); *B62D 5/0487* (2013.01)

(58) Field of Classification Search
CPC .... B62D 6/008; B62D 5/0484; B62D 5/0487; B62D 5/0481; B62D 5/001
See application file for complete search history.

(56) References Cited

U.S. PATENT DOCUMENTS 5,908,457 A * 6/1999 Higashira .............. B62D 6/008 701/41
6,041,884 A * 3/2000 Shimizu ............... B62D 5/0481 180/443
(Continued)

FOREIGN PATENT DOCUMENTS

DE 100 53 335 A1 5/2002
JP 2005199955 A * 7/2005

OTHER PUBLICATIONS

Official Communication issued in International Patent Application No. PCT/EP2021/076000, mailed on Mar. 26, 2024.
(Continued)

*Primary Examiner* — Lindsay M Low
(74) *Attorney, Agent, or Firm* — Keating & Bennett, LLP

(57) ABSTRACT

A method to control a steer-by-wire steering system of a road vehicle, the steer-by-wire steering system including a feedback actuator to apply a feedback torque to a steering wheel and a road wheel actuator to turn steerable road wheels with two redundant power packs each, the method including, if a failure in the road wheel actuator is detected, increasing the feedback torque provided by the feedback actuator to a value higher than a calculated feedback torque, and if a failure in one power pack of the feedback actuator is detected, increasing the feedback torque provided by a functioning power pack of the feedback actuator to a value higher than the calculated feedback torque.

5 Claims, 1 Drawing Sheet

(56) References Cited

U.S. PATENT DOCUMENTS

| | | | | |
|---|---|---|---|---|
| 6,208,923 | B1 * | 3/2001 | Hommel | B62D 5/003 701/41 |
| 6,285,936 | B1 * | 9/2001 | Bohner | B62D 5/06 180/443 |
| 6,548,969 | B2 * | 4/2003 | Ewbank | B62D 5/003 180/402 |
| 6,693,405 | B2 * | 2/2004 | Blanke | B62D 5/003 318/822 |
| 6,776,252 | B1 * | 8/2004 | Andonian | B62D 5/001 180/402 |
| 6,885,922 | B2 * | 4/2005 | Yao | B62D 5/003 701/33.9 |
| 6,913,106 | B2 * | 7/2005 | Katou | B62D 5/003 180/407 |
| 6,929,090 | B2 * | 8/2005 | Furumi | B62D 5/04 180/444 |
| 7,130,728 | B2 * | 10/2006 | Suzuki | B62D 6/008 180/413 |
| 7,500,537 | B2 * | 3/2009 | Itoh | B62D 5/003 180/405 |
| 7,533,757 | B2 * | 5/2009 | Sugitani | B62D 5/0496 180/402 |
| 7,726,436 | B2 * | 6/2010 | Pfeiffer | B62D 5/003 180/407 |
| 11,214,303 | B2 | 1/2022 | Shibata et al. | |
| 11,597,434 | B2 * | 3/2023 | Yamashita | B62D 5/006 |
| 12,286,168 | B2 * | 4/2025 | Ojima | B62D 5/006 |
| 2003/0193305 | A1 * | 10/2003 | Crowley | B62D 5/0481 318/432 |
| 2004/0148078 | A1 * | 7/2004 | Nakano | B62D 5/008 180/443 |
| 2004/0211618 | A1 * | 10/2004 | Ogawa | B62D 5/046 180/402 |
| 2006/0021822 | A1 * | 2/2006 | Yamamoto | B62D 5/0484 701/41 |
| 2006/0090954 | A1 * | 5/2006 | Sugitani | B62D 5/003 180/446 |
| 2006/0200289 | A1 * | 9/2006 | Chino | B62D 6/008 701/41 |
| 2013/0200827 | A1 * | 8/2013 | Kezobo | B62D 5/0403 318/400.21 |
| 2015/0291208 | A1 * | 10/2015 | Miyasaka | B62D 5/0475 701/41 |
| 2015/0321692 | A1 * | 11/2015 | Kuramochi | B62D 5/0496 701/43 |
| 2015/0336606 | A1 * | 11/2015 | Shibuya | B62D 5/001 180/444 |
| 2016/0075370 | A1 * | 3/2016 | Itamoto | B62D 5/0466 701/41 |
| 2017/0166248 | A1 * | 6/2017 | Asao | H02P 29/00 |
| 2017/0282972 | A1 * | 10/2017 | Moretti | B62D 15/0265 |
| 2019/0126971 | A1 * | 5/2019 | Kim | B62D 5/006 |
| 2019/0260324 | A1 * | 8/2019 | Kuramitsu | B62D 5/0484 |
| 2020/0164916 | A1 * | 5/2020 | Shibata | B62D 6/008 |
| 2020/0269913 | A1 * | 8/2020 | Fujimoto | B62D 5/0484 |
| 2020/0406954 | A1 | 12/2020 | Szepessy et al. | |
| 2022/0119033 | A1 * | 4/2022 | Minninger | B62D 6/00 |
| 2022/0250676 | A1 * | 8/2022 | Tomizawa | B62D 5/046 |
| 2022/0258793 | A1 * | 8/2022 | Sun | B62D 5/0487 |
| 2023/0038390 | A1 * | 2/2023 | Watanabe | B62D 6/008 |
| 2024/0025475 | A1 * | 1/2024 | Hirata | B60W 10/18 |
| 2024/0227932 | A1 * | 7/2024 | Kakas | B62D 5/0487 |
| 2024/0308580 | A1 * | 9/2024 | Arányi | B62D 5/001 |

OTHER PUBLICATIONS

Official Communication issued in International Patent Application No. PCT/EP2021/076000, mailed on Jul. 8, 2022.

* cited by examiner

METHOD TO CONTROL A STEER-BY-WIRE STEERING SYSTEM OF A MOTOR VEHICLE WITH INCREASED FEEDBACK TORQUE AFTER FAILURE OF STEERING SYSTEM

CROSS REFERENCE TO RELATED APPLICATIONS

This application claims the benefit of priority to PCT Application No. PCT/EP2021/076000 filed on Sep. 22, 2021. The entire contents of this application is hereby incorporated herein by reference.

BACKGROUND OF THE INVENTION

1. Field of the Invention

The present invention relates to methods to control steer-by-wire steering systems of motor vehicles and steer-by-wire steering systems to perform such methods.

2. Description of the Related Art

In motor vehicles, it is known to implement fail-functional architectures of steer-by-wire steering systems. These include two identical powerpacks which include separate and independent controllers and motors. Failure or degradation of the system must be reported to the driver, for example, by giving feedback via the feedback actuator. If the failure or degradation occurs in the feedback actuator, providing higher feedback torque to signal the restriction can cause higher degradation with time, which is undesired for the system operation or if a failure in one side of the redundant system was the trigger, it can cause degradation of the functioning portion(s) of the system.

SUMMARY OF THE INVENTION

Example embodiments of the present invention provide methods to control steer-by-wire steering systems of motor vehicles which makes it possible to provide feedback to a driver in case of failure or degradation of the system without risking further degradation or failure.

A method to control a steer-by-wire steering system of a road vehicle is provided, wherein the steer-by-wire steering system includes a feedback actuator to apply a feedback torque to a steering wheel and a road wheel actuator to turn steerable road wheels with two redundant power packs each, and the method includes, if a failure in or of the road wheel actuator is detected, increasing the feedback torque provided by the feedback actuator to a value higher than a calculated feedback torque, and if a failure in or of one power pack of the feedback actuator is detected, increasing the feedback torque provided by the power pack of the feedback actuator that is functioning to a value higher than the calculated feedback torque.

This method makes it possible to inform the driver of a malfunction in the steering system without risking further degradation or failure, and no additional components are required.

It is possible that the feedback torque is increased for a defined period of time only, after which the feedback torque is reduced back to the calculated torque if a problem with the actuator, like overheating, occurs. Preferably, the reduction of feedback torque is done gradually.

In terms of variety of parts and costs, it is advantageous if the power packs of the road wheel actuator are identical.

The method can additionally include, if the failure in or of the wheel actuator is detected on one side of a redundant road wheel actuator, switching off the one side and providing at least partly steering functionality with a remaining functioning side.

Further, a steer-by-wire steering system for a road vehicle configured to perform the above described method is provided.

The above and other elements, features, steps, characteristics and advantages of the present invention will become more apparent from the following detailed description of the example embodiments with reference to the attached drawings.

BRIEF DESCRIPTION OF THE DRAWINGS

Example embodiments of the present invention will be described with reference to the drawings.

DETAILED DESCRIPTION OF THE EXAMPLE EMBODIMENTS

Figure 1:
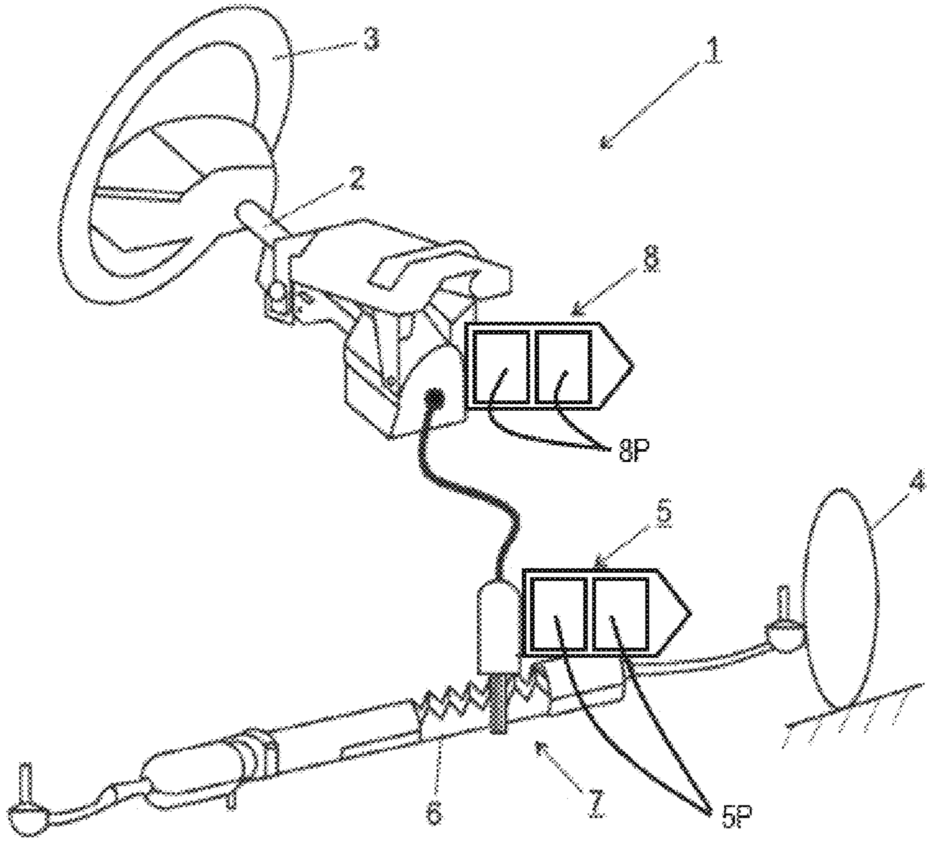
FIG. 1 is a schematic illustration of a steer-by-wire steering system of a motor vehicle.

FIG. 1 is a schematic drawing of a steer-by-wire steering system 1 with a steering shaft 2 connected to a steering wheel 3. There is no mechanical connection between the steering wheel 3 and the road wheels 4. A road wheel actuator 5 operates a gear rack 6 via a rack-and-pinion gear 7.

When a driver operates the steering wheel 3, the steering shaft 2 is rotated, which is detected by a shaft sensor, which is not shown in the drawings. A controller is configured or programmed to calculate an operation signal for the wheel actuator 5 from the signal detected by the shaft sensor. By operating the gear rack 6 with the operation signal, the road wheels 4 are turned. At the same time, forces introduced in the gear rack 6 from the road wheels 4 are recognized by another sensor not shown in the drawings, and a feedback signal is calculated, which is applied to the steering shaft 2 by a steering wheel actuator 8, also called feedback actuator, so that the operator can recognize the feedback in the steering wheel 3.

The road wheel actuator 5 and the feedback actuator 8 each include two redundant power packs 5P and 8P (shown in FIG. 1), which can be identical or of a different design. The power packs 5P and 8P are standard power packs and include separate and independent controllers and motors as noted above.

Figure 2:
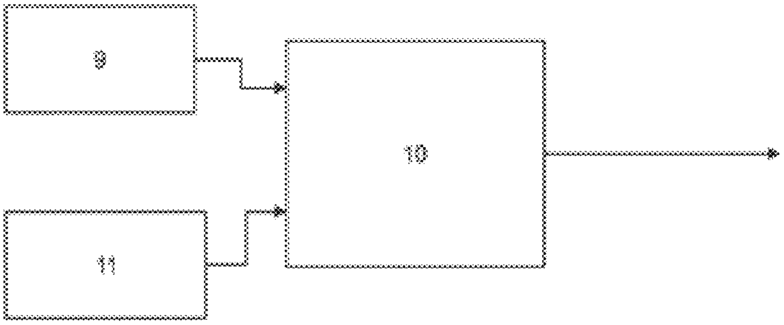
FIG. 2 shows a block diagram of a method to provide feedback to the driver via the feedback actuator in case of a failure in the steering system.

FIG. 2 shows schematically a control method of the steer-by-wire steering system 1. If a failure of the feedback actuator is detected 9 on one side of the redundant system, the respective motor is switched off. To provide feedback to the driver, the controller is informed about the change of state and the motor control circuit increases the feedback torque of the functioning motor to a value higher than the calculated torque (tunable parameter) 10, which can be noted by the driver. After a certain period of time, the feedback torque is gradually reduced back to the calculated torque in order to reliably avoid thermal overload. If problems such as overheating do not occur, the increased torque can be maintained over a longer period of time, e.g., until the vehicle reaches a workshop.

If a failure of the road wheel actuator is detected 11, the feedback torque of the feedback actuator is increased likewise. The failure can be, for example, on one side of the redundant system, which is then switched off and the remaining functioning side takes over the steering functionality at least partly. To give notice to the driver of the failure in the road wheel actuator, the motor control circuit increases the feedback torque of the feedback actuator to a value higher than the calculated torque (tunable parameter). After a certain period of time the feedback torque can be gradually reduced back to the calculated torque if problems such as overheating occur.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method to control a steer-by-wire steering system of a road vehicle, the steer-by-wire steering system including a controller, a feedback actuator to apply a feedback torque to a steering wheel, and a road wheel actuator to turn steerable road wheels with each of the feedback actuator and the road wheel actuator respectively including two redundant power packs, the method comprising:

if a failure in the road wheel actuator is detected, increasing the feedback torque provided by the feedback actuator to the steering wheel to a value higher than a calculated feedback torque which is calculated by the controller;

if a failure in one of the two redundant power packs of the feedback actuator is detected, increasing the feedback torque provided by a remaining one of the two redundant power packs of the feedback actuator that is functioning to the steering wheel to a value higher than the calculated feedback torque which is calculated by the controller; and if a temperature of the feedback actuator becomes equal to or higher than a predetermined value, the feedback torque is only increased for a defined period of time, after which the feedback torque is reduced back to the calculated feedback torque to decrease the temperature of the feedback actuator towards the predetermined value.

2. The method according to claim 1, wherein the feedback torque is reduced gradually.

3. The method according to claim 1, wherein the two redundant power packs of the road wheel actuator are identical in design.

4. The method according to claim 1, further comprising:

if the failure in or of the wheel actuator is detected on one side of a redundant road wheel actuator, switching off the one side and providing steering functionality with a remaining functioning side.

5. A steer-by-wire steering system for a road vehicle configured to perform the method according to claim 1.

* * * * *